United States Patent [19]
McCoy et al.

[11] 3,772,061
[45] Nov. 13, 1973

[54] CONTAINERS AND METHODS OF PREPARING

[75] Inventors: Larry G. McCoy, Columbus; Robert E. Sharpe, Worthington, both of Ohio

[73] Assignee: Liberty Glass Company, Sapulpa, Okla.

[22] Filed: Oct. 14, 1971

[21] Appl. No.: 189,392

[52] U.S. Cl.............. 117/72, 117/94, 117/124 E, 260/29.4 UA, 260/851
[51] Int. Cl.......................... B44d 1/14, C03c 17/32
[58] Field of Search .............. 260/29.4 R, 29.4 UR, 260/851; 117/95, 97, 124 E, 72, 94

[56] References Cited
UNITED STATES PATENTS

| | | | |
|---|---|---|---|
| 2,819,237 | 1/1958 | Daniel........................ | 260/29.4 UA |
| 2,971,931 | 2/1961 | Glade........................... | 260/29.4 UA |
| 3,002,939 | 10/1961 | Balassa et al. ............... | 260/29.4 UA |
| 3,061,568 | 10/1962 | Savina et al.................. | 260/29.4 UA |
| 3,099,635 | 7/1963 | Wagner et al............... | 260/29.4 UA |
| 3,267,174 | 8/1966 | Fry et al....................... | 260/29.4 UA |
| 3,316,123 | 4/1967 | Savina et al. .......... | 260/851 |
| 3,492,252 | 1/1970 | Euchner et al............. | 260/29.4 UA |
| 3,503,918 | 3/1970 | LeSota et al................ | 260/29.4 UA |

*Primary Examiner*—Lorenzo B. Hayes
*Attorney*—Donald G. Leavitt et al.

[57] ABSTRACT

A glass container having improved mechanical strength produced by coating the outside surface thereof with a composition containing a copolymer of acrylonitrile and ethyl acrylate, polyacrylamide and hexamethoxymethyl-melamine and curing said coating.

5 Claims, No Drawings

3,772,061

CONTAINERS AND METHODS OF PREPARING

BACKGROUND OF THE INVENTION

This invention relates to the field of armor coatings and more particularly to an improved containment coating for glass containers.

In the container industry, substantial efforts have been devoted to developing methods for improving the impact and burst strength of glass containers without significantly adding to the cost of producing such containers. Improvement in impact and burst strength can provide not only important economic benefits through reduced attrition, but can also make critical contributions to the personal safety of those who fill, handle and use glass containers.

Since the provision of a glass beverage container resistant to either impact or burst failure under all possible conditions of handling is not economically feasible within the current state of the art, substantial efforts have also been devoted to the development of ways of mitigating the consequences of the failure of such containers. Important objects have been to minimize both the degree of fragmentation and the extend of scatter of the fragments produced when a glass bottle fails.

Each of the properties of the impact resistance, burst strength, resistance to fragmentation and minimization of scatter is particularly important where a beverage bottle is used for packaging a carbonated beverage. Bottles for carbonated beverages are routinely exposed to internal pressures in the range of about 50 psig. If and when such a bottle is broken, the resulting fragments, particularly if they are very small, can be propelled at high velocity by the carbon dioxide which is released. If these fragments strike a person, serious injuries may result. Occasionally a beverage bottle explodes due to the force of internal pressure alone. Numerous serious injuries have been cuased by exploding beverage bottles.

As a means of improving the mechanical properties of beverage bottles in the above-noted respects, it has been proposed to provide such bottles with a "containment" or protective coating. Compositions and processes are known, for example, which may be utilized to provide a glass container with a relatively thick coating of styrene foam for containment. Styrene foam containment coatings are esthetically undesirable since they are white and opaque, thus preventing observation of the contents of the bottle. Glass containers also are known to have an outer lubricating film of polyethylene over an intermediate layer of a metal oxide such as a tin or titanium oxide for abrasion protective purposes. However, these do not provide satisfactory impact resistance and containment.

As a result of the conditions encountered in the filling, handling and usage of a beverage bottle, a containment coating must meet a number of diverse criteria in addition to the mechanical properties noted above. To avoid interference with visual observation of the bottle's contents, the coating should possess a high degree of clarity. To simplify processing and minimize abrasion problems, the coating should possess a high degree of lubricity. To survive general usage and, in particular, to survive bottling plant processing, the coating should be resistant to both alkali and hot water. In order to minimize fire hazards in the process of coating the bottle, the containment coating composition should not include significant proportions of flammable organic solvents, and desirably should be water based. Finally, the containment coating must be inexpensive to formulate and apply, failing which its use and application to beverage bottles is not feasible or practically economic.

Prior to the present invention, containment coatings have not been available which are satisfactory in each of the above respects.

SUMMARY OF THE INVENTION

Among the several objects of the present invention, therefore, may be noted the provision of a coating composition which, when applied to the surface of a glass container and cured, imparts improved impact strength to such containers; the provision of such a composition which yields a cured coating imparting improved burst strength retention to the container; the provision of a composition of the character described which yields a cured coating which retards both the degree of fragmentation and the extent of scatter of the glass should the container break; the provision of such a composition which yields a coating of high clarity; the provision of such a composition which yields a coating resistant to both alkali and hot water; the provision of such a composition which is water based and does not require the presence of flammable organic solvents; the provision of a novel glass container having such a cured composition adhered to the outside surface thereof; and the provision of a method for imparting improved mechanical strength to a glass container with such compositions. Other objects and features will be in part apparent and in part pointed out hereinafter.

Briefly, therefore, the present invention is directed to a thixotropic composition which is useful in forming a containment coating for glass containers. The basic constituent of the composition is a latex, the latex containing at least about 30 percent by weight of a particulate resin comprising a copolymer of acrylonitrile and ethyl acrylate. The composition also contains between 1.8 and about 7.5 parts by weight hexamethoxymethylmelamine per 100 parts by weight of the latex, and a sufficient proportion of polyacrylamide to impart to the composition a Brookfield viscosity of between about 2,000 and about 9,000 cps at 1 rpm and a Brookfield viscosity of between about 600 and about 2,400 cps at 5 rpm.

The invention is also directed to a glass container having adhered to the outside surface thereof a cured acrylic coating, said coating being derived from curing of the above described coating composition.

The invention is further directed to a method of imparting improved mechanical strength to a glass container. The method comprises the steps of contacting the outside surface of the container with the above noted coating composition; and curing said composition to provide a containment coating which increases the container's resistance to both breakage and abrasion.

Description of the Preferred Embodiments

In accordance with the present invention, an acrylic containment coating composition is provided which is readily applied to the surface of a glass container, as by dripping, and is readily cured into a clear, glossy, tough and adherent coating on the outer surface of the container. The coating of the invention typically has a thickness on the order of 2 to 4 mils, depending on the conditions under which the container is contacted with the coating composition. The cured coating is not seriously affected by immersion in hot alkali solution. For example, it is resistant to 3 percent alkali solution containing 2.5 percent sodium hydroxide and 0.5 percent trisodium phosphate at 120°–150°F. for from about 10 to 30 minutes. After exposure to line simulation abrasion, the coated containers of this invention exhibit burst strengths on the order of 30 percent or more higher than the burst strengths of standard production bottles which have been similarly exposed to line simulation but have not received the coating composition of the invention. Comparable improvements are obtained with respect to incidence of fracture, degree of fragmentation and scatter of fragments, when both coated and uncoated bottles are subjected to drop tests.

The coated container of the invention also possesses superior abrasion resistance. The cured coating, moreover, is well adapted to the receipt of a thin film of polyethylene on the external surface thereof which provides a high degree of lubricity and further contributes to the resistance of the container to abrasion during processing and handling.

The abrasion resistance imparted by the cured coating, particularly where an outer coating of polyethylene is included, is especially advantageous in the case of bottles which have been subjected to chemical strengthening by means of ion exchange. Methods are known in the art by which a thin layer adjacent to the outside surface of a bottle is placed under compressive stress by exchanging the principal cations thereof for other cations of either larger or smaller ionic diameter. Such methods are commonly referred to as "ion stuffing." The provision of a thin compressed "ion stuffed" outer layer substantially increases the strength of the bottle, but due to its lack of substantial thickness, such a layer is highly subject to damage on abrasion, with consequent loss of the extra strength which the layer originally imparts. The presence of an abrasion resistant outer coating derived from the coating compositions of the invention protects the thin compressively-stressed layer from damage, and preserves the strength which it imparts to the bottle.

In addition to substantially improving the serviceability and handling safety of glass containers, the compositions of the present invention are relatively inexpensive to formulate and apply. Since they are water based, moreover, the compositions need not contain any flammable organic solvents, thus avoiding any significant fire hazards in the process of their application and curing.

The film-forming constituent of the composition of the invention is an acrylic latex containing at least about 30 percent by weight resin solids. The preferred latex constituent is that sold under the trade designation "Hycar 2,600 × 138" by the B. F. Goodrich Company. This latex has a specific gravity of about 1.07 and contains approximately 50 percent by weight of a particulate resin constituted by a copolymer of acrylonitrile and ethyl acrylate. Approximately 70 percent by weight of the repeating units of the resin copolymer are derived from ethyl acrylate, and approximately 30 percent by weight of the repeating units of the copolymer are derived from acrylonitrile. The specific gravity of the resin is about 1.14. The emulsifying agent in the latex is a synthetic anionic surfactant. As those skilled in the art will recognize, other copolymers of acrylonitrile and ethyl acrylate having the necessary resin solids content could be substituted for the copolymer utilized in "Hycar," and various other surfactants could be substituted for the emulsifying agent present therein.

Hexamethoxymethylmelamine serves as a crosslinking agent in the curing of the coating composition of the invention. The presence of between about 1.8 and about 7.5 parts hexamethoxymethylmelamine per 100 parts by weight latex in the coating formulation promotes the formation of a cured coating film of high strength and hardness which is resistant to both hot water and alkali. A hexamethoxymethylmelamine especially suitable for use in the invention is that sold under the trade designation "Cymel 300" or "Cymel 301" by American Cyanamid.

The viscosity of the coating composition determines both the wet film thickness obtained in application of the coating to the surface of a container and the resistance of the wet film to sagging or running prior to and during the curing operation. Under the moderate shear conditions encountered during application of the composition, accomplished, for example, by dipping, it is preferable that the coating composition have a slightly lower viscosity than is desired for dimensional integrity of the wet film under the low shear conditions which are maintained after application of the coating composition is complete. Thus, the coating composition of the invention is thixotropic, preferably having a Brookfield viscosity of between about 2,000 and about 9,000 centipoises at 1 rpm using a No. 2 spindle, and a Brookfield viscosity of between about 600 and about 2,400 centipoises at 5 rpm using a No. 2 spindle. Having these viscosity characteristics, the composition can be applied as a relatively thick film which does not run, sag, crack or craze during or after the curing process.

The coating compositions of the invention are thickened and rendered thixotropic by the presence of polyacrylamide. A sufficient amount of polyacrylamide is included to impart a Brookfield viscosity of between about 2,000 and about 9,000 cps at 1 rpm (No. 2 spindle) and between about 600 and 2,400 cps at 5 rpm (No. 2 spindle). Typically, the polyacrylamide content is between about 0.01 and about 0.06 parts by weight per 100 parts by weight latex. For optimum results, the polyacrylamide constituent preferably has a high molecular weight and is slightly anionic. An illustratively useful polyacrylamide is that sold under the trade designation "Polyhall 295" by Stein, Hall & Company.

The viscosity of a given coating formulation can be adjusted by further addition of polyacrylamide, which further thickens the composition, or by addition of water, which reduces the composition's viscosity. As

TABLE 1.—VISCOSITY VARIATION WITH WATER CONTENT

| Parts by wt., latex | Parts by wt., 1% aqueous solution of polyacrylamide | Parts by wt., hexamethoxy-methylmelamine | Parts by wt., water | Viscosity*, cps |
| --- | --- | --- | --- | --- |
| 100 | 5 | 3.5 |  | 1600 |
| 100 | 5 | 3.5 | 5 | 1200 |
| 100 | 5 | 3.5 | 10 | 1000 |
| 100 | 5 | 3.5 | 15 | 700 |

*Brookfield viscometer, 5 rpm, #2 spindle.

shown by Table 1, the viscosity of the composition is quite sensitive to small incremental additions of water.

The shelf life of a composition of this invention, and its stability at elevated operating temperatures in the process of coating bottles, is increased if the composition is alkaline. Preferably the composition has a pH of at least about 8.0. At this pH the composition has a shelf life of about 30–35 days at 75°–80°F., 48 hours at 120°F. and 16–24 hours at 145°F. The freeze/thaw characteristics of the composition are also good. The alkalinity of the coating composition may be adjusted by the addition thereto of small proportions of a base such as, for example, ammonium hydroxide, sodium hydroxide, dimethylaminoethanol or other bases known to those skilled in the art.

The coating compositions of the invention are preferably prepared by adding hexamethoxymethylmelamine and a dilute aqueous solution of polyacrylamide to the latex in a suitable mixing vessel. Typically, a 0.5–1 percent by weight solution of polyacrylamide is utilized. Where larger scale operations are involved, the weaker solution is preferred. As noted, a base is preferably included also to adjust the pH of the composition to approximately 8.0 or slightly higher. Mixing should be thorough to insure uniform distribution of all components, but should be not so vigorous as to entrap significant amounts of air in the composition. Air entrapment may result in bubble formation which can result in the appearance of voids in the coating after application to a bottle or other glass container.

In accordance with the method of the invention, the coating compositions may be applied to the surface of a glass container by any suitable means, for example, spraying. Preferably, however, the container surface is contacted with a composition of the invention by dipping the container therein. Where a dipping process is employed, the container is conveniently withdrawn from the coating composition bath at a rate of between about 4 inches per minute and about 3 feet per minute, typically about 1 foot per minute. Where the coating formulation has a Brookfield viscosity in the range of 1,000 to 1,200 centipoises at 5 rpm using a No. 2 spindle, a wet film thickness of approximately 4 mils is obtained at a 1 foot per minute withdrawal rate. Although withdrawal rates up to 3 feet per minute are feasible, the container is preferably withdrawn at a rate less than about 20 inches per minute to insure a high degree of uniformity of thickness throughout the film. The wet film is rapidly dried and its acrylic constituent cross-linked at elevated temperatures to produce a cured coating. Conveniently, curing may take place in a forced air oven at a temperature of between about 350°F. and 500°F. for between about 3 and about 30 minutes. Preferably, the coating composition is cured at about 450°F. for approximately 4 minutes.

According to a preferred embodiment of the invention, an outer coating of polyethylene is applied following curing of the acrylic coating. The outer coating of polyethylene is most conveniently applied by spraying, and does not require further treatment.

The following examples illustrate the invention:

EXAMPLE 1

To an acrylic latex, sold under the trade designation "Hycar 2600 × 138" by B. F. Goodrich Company (100 parts by weight) was added a 1 percent by weight solution of a polyacrylamide sold under the trade designation "Polyhall 295" by Stein, Hall & Company (2.5 parts by weight), and hexamethoxymethyl-melamine sold under the trade designation "Cymel 300" (2.0 parts by weight). The resulting mixture was agitated at low speed until all the components were uniformly distributed. A beverage bottle was dipcoated with the resulting composition and the wet film thus formed was cured at 400°F. for 10 minutes. The cured film was exposed to hot water for 10 minutes at 140°F. No blush appeared although a slight tack did develop.

EXAMPLE 2

A coating composition was prepared in accordance with the method described in Example 1 except that 3.0 parts by weight of "Cymel 300" were used. A beverage bottle was dip coated with this composition in the manner described in Example 1. After exposure of the cured coating to 140°F. water for 10 minutes, the cured coating showed no blush or tack.

EXAMPLE 3

A coating composition was prepared in the manner described in Example 1 except that 7.5 parts by weight of "Cymel 300" were used. A beverage bottle was coated with this composition in the manner described in Example 1. After exposure of the coating to 140°F. water for 10 minutes, the cured coating showed no blush or tack.

EXAMPLE 4

A coating composition was prepared in the manner described in Example 1 except that 5 parts of a 1 percent by weight solution of "Polyhall 295" and 3.5 parts by weight of "Cymel 300" were used. This composition had a Brookfield viscosity of approximately 5,800 cps at 1 rpm and 1,700 at 5 rpm, measured using a No. 2 spindle. A beverage bottle was coated with this composition in the manner described in Example 1. This coating was exposed to a 3 percent sodium hydroxide solution for 30 minutes at 120°F. After such exposure, the coating exhibited very slight blush and no tack along with good tear resistance.

EXAMPLE 5

A coating composition was prepared and applied to a glass beverage bottle in the manner described in Example 4 and the wet coating cured at 400°F. for 7 minutes. The cured coating was then exposed to a 3 percent by weight sodium hydroxide solution for 30 minutes at 120°F. After such exposure, the cured coating exhibited very slight tack, slight blush and fair tear resistance.

EXAMPLE 6

A coating composition was prepared in the manner described in Example 4 except that 4.0 parts "Cymel 300" were used. A beverage bottle was coated with this composition in the manner described in Example 1. The cured coating was exposed to a 3 percent by weight sodium hydroxide solution for 30 minutes at 120°F. after which it exhibited very slight tack, very slight blush and good tear resistance.

EXAMPLE 7

A coating composition was prepared in accordance with the method described in Example 4. A beverage bottle was dip-coated with this composition and the wet film produced was cured for 10 minutes at 375°F. The cured coating was exposed to 140°F. water for 10 minutes after which it exhibited moderate blush, moderate tack and fair tear resistance.

EXAMPLE 8

A coating composition was prepared in accordance with the method described in Example 1 except that 10 parts of a 0.5 percent aqueous solution of "Polyhall 295" were used in place of 2.5 parts 1 percent "Polyhall 295," and 4 parts of "Cymel 300" were used. Using a No. 2 spindle, the Brookfield viscosity of this composition was determined to be 4,600 cps at 1 rpm and 1,300 cps at 5 rpm. A series of 10 oz. "Coke" (registered trademark of Coca-Cola Company) bottles were coated with this composition in the manner described in Example 1. After the coatings were cured, some bottles were subjected to abrasion tests. A standard Ball Brothers type scratch tester was employed. Using this tester, two bottles at a time were rubbed together with a pressure of 75 pounds. The surface of the coating on each of the bottles so tested showed no scratching though in some case slight marring.

Additional coated bottles were subjected to line simulation by the AGR line simulator; certain of these bottles were subjected to burst tests, while others of these bottles were subjected to drop tests. To provide a basis of comparison, standard 10 oz. "Coke" bottles, from the same production source, were subjected to line simulation, burst, and drop tests under identical conditions. The standard production bottles tested has been provided with a thin coating of tetraisopropyl titanate, followed by a thin outer coating of polyethylene, in accordance with conventional practice.

The average burst pressure of the acrylic coated bottles was 420 psi, 84 percent of the burst strength before line simulation. By contrast, the standard production bottles exhibited an average burst pressure of only 305 psi, or 62 percent of the burst strength prior to line simulation.

IN the drop test, the bottles were filled with 10 ounces of water and pressurized to 50 psig with argon and then dropped from heights of 1, 2 and 3 feet on a concrete surface. Various drop angles, i.e., the angle between the bottle axis and the vertical as the bottle is dropped, were utilized, ranging from 10° to 90° (horizontal). Ten acrylic coated and 10 standard bottles were dropped from each height at each drop angle. Each bottle was dropped only once. Table 2 shows the incidence of fracture of the bottles dropped in accordance with the tests.

space while others were filled with sufficient water to leave a 12 cubic centimeter head space. The free volume of each bottle was filled with argon to a pressure of 50 psig. Certain of the bottles were then dropped three feet on a concrete surface from a horizontal orientation while others of the bottles were oriented at 10° from the vertical and dropped 5 feet on the concrete surface. For purposes of comparison, a number of standard production bottles (having thin coatings of tetraisopropyl titanate and polyethylene) were similarly subjected to line simulation, partially filled with water (leaving 6 cubic centimeters head space in some bottles and 12 cubic centimeters head space in other bottles), pressurized at 50 psig with argon, and dropped on the concrete surface from the same respective heights at the same respective bottle orientations as the coated bottles. The heights and orientations were such that all of the bottles, both acrylic coated and standard, broke. To determine the degree of fragmentation and scatter, a count was made of the number of fragments having at least one dimension of one-half inch or larger lying within specified ranges of diameters from the point of impact. The results of this test are set forth in Table 3.

TABLE 3.—SPACIAL DISTRIBUTION OF "COKE" BOTTLE FRACTURE FRAGMENTS AROUND THE POINT OF DROP IMPACT ON CONCRETE

| Size of circle or annular disc area of floor from which fragments were collected | | Number of fragments collected | | | |
|---|---|---|---|---|---|
| | | 12 cc head space | | 6 cc head space | |
| Inside diameter, ft. | Outside diameter, ft. | Standard | Acrylic coated | Standard | Acrylic coated |
| | | Bottles oriented horizontally and dropped 3 feet | | | |
| 0 | 5 | 60 | 40 | 65 | 38 |
| 5 | 10 | 15 | 6 | 8 | 4 |
| 10 | 15 | 5 | 2 | 4 | 1 |
| 15 | 20 | 5 | 0 | 1 | 0 |
| | | Bottles with their axes oriented at 10° from vertical and dropped 5 feet | | | |
| 0 | 5 | 36 | 16 | 49 | 17 |
| 5 | 10 | 15 | 8 | 16 | 6 |
| 10 | 15 | 12 | 5 | 4 | 5 |
| 15 | 20 | 11 | 8 | 22 | 7 |

TABLE 2.—FRACTURE DATA FOR FILLED PRESSURIZED "COKE" BOTTLES DROPPED ON CONCRETE

| | Number of bottles broken out of a test set of ten | | | | | |
|---|---|---|---|---|---|---|
| Drop height* (ft) | 1 | | 2 | | 3 | |
| Bottle coating | Standard | Acrylic coated | Standard | Acrylic coated | Standard | Acrylic coated |
| Drop angle: | | | | | | |
| 10° | 2 | none | 7 | 3 | 8 | 2 |
| 20° | 1 | none | 7 | 3 | 9 | 4 |
| 30° | 0 | none | 5 | 1 | 7 | 3 |
| 50° | 0 | none | 1 | 1 | 7 | 4 |
| 90° (horizontal) | 5 | none | 10 | 3 | not tested | 5 |

*Drop height was measured between the bottom most part of bottle and the floor.

EXAMPLE 9

A number of 10 oz. "Coke" bottles were coated with a composition as prepared in Example 8 in accordance with the method described in Example 1. After the coating was cured, certain of the bottles were filled with enough water to leave a 6 cubic centimeter head Certain of the bottles, both acrylic coated and standard, which had 12 cubic centimeter head spaces were dropped on a vinyl surface from the same respective heights and orientations. A similar determination of the scatter of fragments was made, and the results are set forth in Table 4.

TABLE 4.—SPACIAL DISTRIBUTION OF "COKE" BOTTLE FRACTURE FRAGMENTS AROUND THE POINT OF DROP IMPACT ON VINYL

| Size of circle or annular disc area of floor from which fragments were collected | | Number of fragments collected, 12 cc head space | |
|---|---|---|---|
| Inside diameter, ft. | Outside diameter, ft. | Standard | Acrylic coated |
| Bottles oriented horizontally and dropped 3 feet | | | |
| 0 | 5 | 88 | 39 |
| 5 | 10 | 15 | 5 |
| 10 | 15 | 4 | 1 |
| 15 | 20 | 1 | 1 |
| Bottles with their axes oriented at 10° from vertical and dropped 5 feet | | | |
| 0 | 5 | 74 | 17 |
| 5 | 10 | 17 | 6 |
| 10 | 15 | 12 | 2 |
| 15 | 20 | 13 | 2 |

In view of the above, it will be seen that the several objects of the invention are achieved and other advantageous results attained.

As various changes could be made in the above methods and products without departing from the scope of the invention, it is intended that all matter contained in the above description shall be interpreted as illustrative and not in a limiting sense.

What is claimed is:

1. A glass container having adhered to the outside surface thereof a cured acrylic coating, said coating being derived from curing of a coating composition comprising:
    a latex, said latex containing at least about 30 percent by weight of a resin comprising a copolymer of acrylonitrile and ethyl acrylate;
    between about 1.8 and about 7.5 parts by weight hexamethoxymethylmelamine per 100 parts by weight of said latex; and
    a sufficient proportion of polyacrylamide to impart to said composition a Brookfield viscosity of between about 2,000 and about 9,000 cps at 1 rpm and a Brookfield viscosity of between about 600 and about 2,400 cps at 5 rpm.

2. A container as set forth in claim 1 having a layer of polyethylene adhered to the outside surface of said cured acrylic coating.

3. A method of imparting improved mechanical strength to a glass container comprising the steps of:
    contacting the outside surface of said container with a thixotropic coating composition comprising
    a latex, said latex containing at least about 30 percent by weight of a resin comprising a copolymer of acrylonitrile and ethyl acrylate;
    between about 1.8 and about 7.5 parts by weight hexamethoxymethylmelamine per 100 parts by weight of said latex; and
    a sufficient proportion of polyacrylamide to impart to said composition a Brookfield viscosity of between about 2,000 and about 9,000 cps at 1 rpm and a Brookfield viscosity of between about 600 and 2,400 cps at 5 rpm; and
    curing said composition to provide a containment coating which increases the container's resistance to both breakage and abrasion.

4. A method as set forth in claim 3, wherein the container is contacted with said coating composition by dipping therein.

5. A method as set forth in claim 3 wherein said coating composition is cured by raising it to a temperature of between about 350°F. and about 500°F. for a period of about 3 to about 30 minutes.

* * * * *